Feb. 7, 1956  G. M. BOOTH  2,733,814
SLURRY FEEDER
Filed April 4, 1952

INVENTOR.
George M. Booth
BY
Robert S. Dunham
ATTORNEY

United States Patent Office 2,733,814
Patented Feb. 7, 1956

2,733,814

SLURRY FEEDER

George M. Booth, Westfield, N. J., assignor to Wallace & Tiernan Incorporated, a corporation of Delaware Application April 4, 1952, Serial No. 280,686

11 Claims. (Cl. 210—1)

This invention relates to apparatus for feeding slurries or other liquids, and more particularly to slurry feeders whereby successive, usually small quantities of a slurry, i. e. a liquid suspension of finely divided solid material, are fed more or less continuously into a flowing body of liquid, for distribution of the solid particles in the latter.

While apparatus of this character may find a variety of uses as in feeding slurries of many kinds of puverulent materials for different purposes, one important embodiment of slurry feeders is in connection with the supply of filter aid in filtering systems. Thus in water filtration apparatus it is sometimes desirable to feed a relatively continuous but usually small quantity of a slurry such as diatomaceous earth into the water as the latter goes to the filter. The filter aid material so supplied continuously builds up a layer on the filter septum to effectuate the filtration process, the feed of slurry being thus constantly effective to keep a fresh outer surface of the material at the septum. A particularly convenient way of introducing the diatomaceous earth or the like is to make it up as a relatively concentrated slurry, which is then fed into the liquid to be filtered, e. g. into water which may be continuously flowing past the locality of slurry introduction.

For these and like purposes and especially for installations of larger size, slurry feeding has usually been accomplished with apparatus involving conventional pumps and check valves, arranged to draw slurry from a reservoir and advance it to the locality of introduction in the flowing stream. Not only does the abrasive character of the particles produce rapid wear of the conventional mechanical equipment, but the slurry constantly tends to clog the pump and the various check valves, especially the latter. That is to say, slurry particles get into all the sliding or bearing surfaces, often to the point of stopping the operation, and particularly collect in and around the valves for impairment of their function. Indeed during closing movements of the valves, the accumulating particles tend to prevent proper seating, with the result of undesirable back flow and other difficulties. In order to alleviate these problems, the slurry is usually established and withdrawn from its reservoir in as dilute a state as possible, but in consequence the reservoir must be very large and there must be extraordinary means for constant and vigorous agitation to keep the rapidly settling particles in the necessary dilute suspension; then, to handle the dilute slurry, the pumping means must be of correspondingly large capacity. In consequence, the entire equipment, especially with the big slurry tank, is extremely bulky, cumbersome and expensive; it is troublesome to make up or add further quantities of slurry; and despite the use of dilute slurries, difficulties of clogging and of poor or improper valve action persist all the time, requiring frequent shutdown for cleaning or other service.

Accordingly, a primary object of the present invention is to provide a slurry feeder wherein the above problems and difficulties are effectively avoided or minimized, and particularly to provide compact and efficient slurry feeding apparatus, operable in an automatic and essentially continuous manner and without appreciable difficulty due to clogging, settling or abrading action by the solid particles. Another object is to afford improved slurry feeders having positive, effective action of valves and other parts at all times, unhampered by collecting particles of slurry, and free of need for frequent cleaning or other attention to assure complete closing and opening action of the valves.

A further object is to provide novel slurry feeding apparatus adapted to handle slurries having any one of a wide range of concentrations, including very thick or heavy mixtures; and a corollary object is to afford such apparatus which may be of relatively small dimensions, needing only a small slurry tank and means of comparatively small capacity and size for displacing slurry, yet having an effectively large capacity as measured in actual amount of solid material fed.

Additional objects include the provision of such apparatus which may be readily controlled or adjusted for accurate maintenance of any desired rate of feed, and likewise the provision of feeding apparatus which will require little or no service over long periods of time. It is also an object to provide slurry feeders of more efficient and reliable construction in a variety of respects, and likewise to provide such feeders wherein the supply of slurry may be constantly maintained, indeed with successive additions as necessary from time to time, all without interrupting the desired feeding operation.

To these and other ends the nature and principles of the invention may be conveniently understood by reference to the following description and the annexed drawing, which shows, in a manner simplified for better illustration of underlying principles the fundamental elements and relationships of one satisfactory embodiment.

Figure 1:
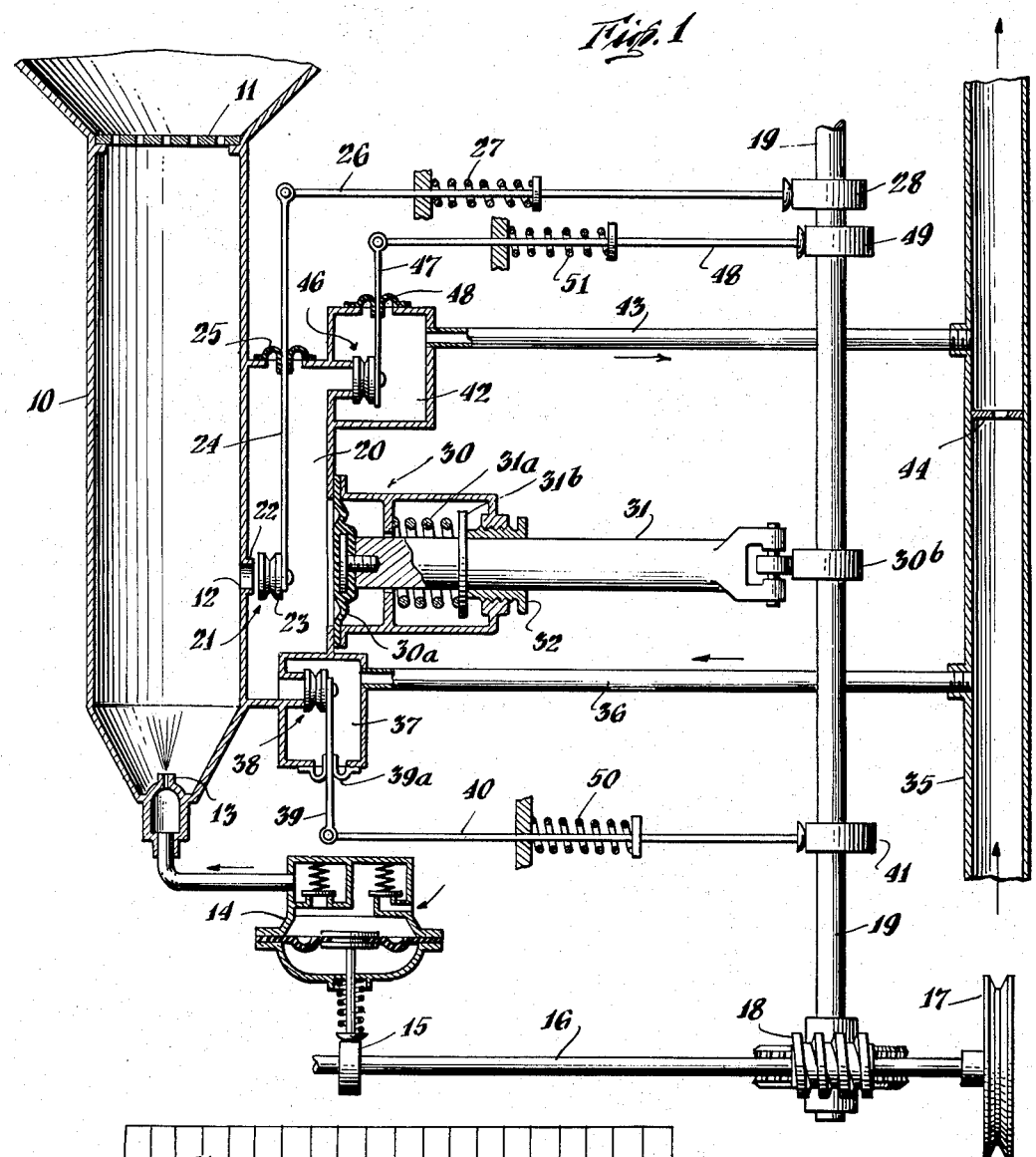
Fig. 1 illustrates somewhat diagrammatically the improved slurry feeder.

Referring to the drawing, 10 designates a slurry hopper, sometimes hereinafter referred to as a liquid reservoir or as a fluid supply means, provided with a removable screen 11 adjacent the top. The lower part of the slurry hopper forms a tank having an outlet port 12 in the side wall thereof towards the bottom. At the bottom of the tank there is provided a rubber check valve 13 through which agitating air may be admitted. This air bubbles up through the slurry and keeps the solid particles in even suspension. To supply such agitating air a diaphragm-type air compressor 14 is provided. The compressor is conveniently operated by a cam 15 disposed upon a high speed shaft 16, which is provided with a pulley 17 adapted to receive drive by a belt from a suitable source of power, not shown. Worm reduction gearing 18 is also provided for operating a low speed shaft 19, i. e. from the same drive shaft 16. While other arrangements such as mechanical stirring devices may be used for agitating the slurry supply in the reservoir 10 to keep the particles in more or less uniform suspension, the air agitation afforded by means of the character just described is very effective in at least most cases and has therefore been illustrated by way of example. It will also be understood that the driving instrumentalities, while convenient, are illustrative and that other means may be provided for actuating the several shafts or more specifically the compressor 14 and the various valve mechanisms hereinbelow described.

Adjacent to the tank part of the slurry hopper there is a pumping and dilution chamber or receiving chamber 20. The port 12 connects the slurry hopper with this chamber through a suction valve generally designated 21. This valve and the other valves preferably comprise a nylon seat portion 22 which cooperates with a rubber valve member 23. Valve part 23 is carried on a valve lever 24 which extends through a flexural rubber seal 25 which forms a closure for a portion of the upper part of the dilution and pumping chamber, i. e. a diaphragm-type seal of rubber or the like which permits the lever to rock about its point of egress from the chamber. The valve lever 24 is preferably fulcrumed in such rubber seal and at its top or outer end, the lever 24 is pivotally connected to the cam follower rod 26. Appropriate structure, such as a suitable spring 27 acting on the rod 26, normally tends to keep the valve 23 against the seat 22. Valve follower rod 26 is operated by a cam 28 disposed on the low speed cam shaft 19.

For withdrawing measured quantities of slurry from the slurry tank chamber into the pumping and dilution chamber 20, a diaphragm pump 30 is in communication with the chamber 20, e. g. opening directly into the chamber, and the diaphragm 30a of this pump is preferably mechanically operated from a cam 30b on shaft 19 by the rod 31. To return the diaphragm to the right a suitable spring means 31a is provided, e. g. a spring under compression, acting against a flange 31b fixed on or integral with the rod 31. The stroke of the diaphragm 30a may be adjusted by adjusting the position of the diaphragm adjustor generally designated 32, which constitutes a stop for the flange 31b to limit the rightward travel of the diaphragm rod 31. Assume diaphragm 30a in the extreme left position and then moved to the right (as shown in the drawing), this movement of the diaphragm will withdraw slurry from the slurry tank and admit it into the pumping and dilution chamber 20, provided suction valve 21 is open. Operation of diaphragm 30a effectively varies the volume of chamber 20, which is therefore sometimes referred to herein as a variable volume chamber.

In the operation of this slurry feeder, dilution water is taken from a pipe or main 35 into which slurry is to be fed, and passed through a pipe 36 to a flushing valve chamber 37. This flushing valve chamber is in communication with the dilution chamber 20 through a flushing valve generally designated 38. Flushing valve 38 is generally like the suction valve previously described. It includes the rubber valve portion, the nylon seat, and it also includes an operating lever 39 which is fulcrumed in the flexural rubber seal 39a (similar to the seal 25) which forms a closure for the bottom of the flushing chamber 37.

Lever 39 is pivoted to a cam follower rod 40 cooperating with a cam 41 on the shaft 19. Adjacent the top or other end of the dilution chamber there is another flushing chamber 42 which communicates with the water pipe or main 35 through a pipe 43.

The main flow pipe 35, intermediate the pipes 36 and 43, is preferably (although not always necessarily) provided with a restricted orifice generally designated 44. The flushing valve 46 is generally like the valve 38 and is operated by the lever 47 which passes through (and is fulcrumed in) a flexural rubber seal 48 of the same type. The lever 47 is pivoted to cam follower rod 48 which cooperates with a cam 49 on the shaft 19. Suitable means, for example springs 50 and 51, tend to keep the valves 38 and 46 in cooperation with their seats, i. e. biased toward closed position in the same manner as the valve 21.

In general, operation of the apparatus may be best understood by first considering diaphragm 30a in extreme left-hand position, i. e. as displaced leftward (from the position shown) to the limit of the rise of the cam 30b. As the cam shaft operates, the diaphragm 30a moves to the right under the influence of the restoring spring 31a and with suction valve 21 in open position. A measured amount of slurry will thus be withdrawn from the slurry hopper and admitted into the pumping and dilution chamber 20.

Figure 2:
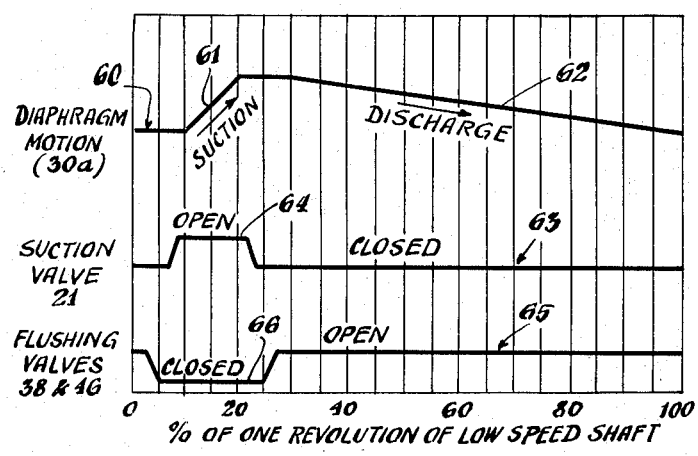
Fig. 2 is a valve timing diagram.

By referring to the timing diagram, Fig. 2, it will be noted that this suction motion of the measuring diaphragm occurs at a time when the suction valve 21 has already been shifted to fully opened position. It is only after the diaphragm 30a has reached its extreme right-hand position that the suction valve 21 closes. As shown in the timing diagram, the flushing valves 46 and 38 will be closed at this time and their period of closure will be terminated after the suction valve is closed and the diaphragm 30a has completed its suction stroke. Thereafter the flushing valves are both opened, the opening operation preferably occurring during the time the diaphragm 30a is at rest.

Preferably with the aid of the slight differential in pressure (for example, ¼ lb. per square inch across the orifice 44) in the water pipe 35, water will be admitted through pipe 36, through the chamber 37, through the open flushing valve into the dilution chamber 20, and in such chamber it will dilute (i. e. further dilute) the slurry previously there introduced, and will thence carry the diluted slurry through pipe 43 into the water in the main 35. It will be understood that in normal operation the chamber 20 is filled with water at all times, and the successive quantities of slurry are drawn directly into this body of water from the reservoir 10.

Although the diaphragm 30a displaces in a discharge direction during the travel of flushing water through the dilution chamber 20, it is essentially (in the preferred construction and operation of the apparatus) the passage of flushing water and not the diaphragm displacement that carries the diluted slurry to the point of application in the water pipe or main 35; in fact in the device shown the slurry would be discharged even without the diaphragm motion. Thus the diaphragm is moved during this time in the cycle simply to get it in position to make a suction stroke for the next cycle.

In other words, although the diaphragm device 30 goes through the motions of an ordinary pump, its displacement on the suction side is the only one of importance to the actual slurry feeding operation. The suction stroke is intended to withdraw a measured amount of slurry from the slurry hopper into the pumping and dilution chamber 20. During the discharge stroke of the diaphragm, the actual flow of liquid into and from the chamber 20 is usually many times that due to the displacement of the diaphragm.

The timing of the several valves and likewise of the suction and reverse strokes of the diaphragm 30a, is illustrated in Fig. 2, where a single revolution of the low speed shaft 19 is understood to occur and where in the diaphragm motion line 60, the relatively abrupt rise 61 represents the suction stroke and the long slope 62 the return stroke. The condition of the suction valve 21 is represented by line 63, including its period of opening at 64, while the flushing valves are indicated by the line 65, these valves being open except during their interval of closure 66, it being understood that the flushing valves 38 and 46 are preferably operated simultaneously, and indeed if desired may be actuated by a single cam rather than by two identical cams as shown. It will also now be understood that the timing lines 60, 63 and 65 in Fig. 2 may be taken to represent, diagrammatically, the configuration of the cams 30b, 28, and both of cams 41 and 49, respectively.

As indicated above, the operation of the feeder is simple, positive and effective. The tank or reservoir 10 is filled with the desired liquid, e. g. a slurry of fine particles, which may be as concentrated as desired. Upon setting the drive in motion, the diaphragm pump 14 is actuated to discharge air for agitation of the slurry in the reservoir, while the cam shaft 19 is likewise rotated for its described function. In each cycle, after the flushing valves have been closed, the suction valve 21 is opened and the diaphragm 30a is retracted, pulling a correspondingly predetermined quantity of slurry from the tank into the chamber 20. Thereafter the valve 21 is positively closed, and following its closure, the flushing valves 38 and 46 are opened, so that as explained, liquid travels from the line 35 through the chamber 20, back to the line, carrying the slurry along in a diluted form. This cycle is continuously repeated, with the effect of a substantially continuous feed of dilute slurry into the liquid supplied by the line 36 and discharged through the line 43, i. e. specifically in the arrangement shown, into the liquid traversing the main pipe 35. The rate of feed of slurry is accurately determined by the stroke of the diaphragm 30a and the rate of rotation of the shaft 19, the amount of slurry supplied per unit time being thus essentially independent of the actual quantity of liquid that may flow through the chamber 20. As the supply in the reservoir 10 is depleted, further slurry (or its solid and liquid components) may be added at the top of the chamber, without interrupting the operation of the feeder.

It is particularly to be noted that during the opening and closing of all valves, the diaphragm 30a is at rest, and that the suction valve 21 is opened and closed at times when the flushing valves are closed, while the operations of the latter are similarly performed during periods when the suction valve is closed. These relationships are important, particularly in connection with the suction valve. That is to say, it has been found that slurry particles tend to collect on any valve seat if the valve is closed during actual flow of slurry (or particle-bearing liquid) through the valve aperture. The gradually throttled opening (i. e. as the valve element is closed) tends to act like a filter and thus to build up a quantity of particles which prevent the seat from closing tightly. Experience has shown that this condition occurs very seriously with pumping devices that employ reverse flow operated check valves. However, by making sure that flow of liquid through the valve aperture has ceased before the valve element is moved toward closed position, the described difficulty is substantially or entirely obviated, and a much more satisfactory and reliable operation obtained.

It will also be noted that the present combination includes mechanically operated valves, especially valves of the type having a mutually separable valve member and seat wherein closing and opening are effectuated by displacing the member against and away from the aperture seat. When operated in the described timed relation, these valves are particularly free of difficulties of the sort explained above, and furthermore the mechanical actuation of the valves is advantageous, in a slurry feeder, in that they may be closed with greater force and thus more effectively against obstruction by slurry particles, than is available under many operating conditions of conventional check valves. Indeed although the described valve timing is a feature of unusual advantage, the positively driven closing action of the valves is sufficiently effective than in some cases the timing, e. g. of the diaphragm device 30, need not entirely avoid liquid flow during times of valve displacement. Thus in some embodiments of the apparatus, a little flow (as by the final motion of the diaphragm 30a) may even be permissible through the suction valve 21 when it is closing, especially where the mechanism of the valve 21 is fast and powerful in its action and thus brings the valve member 23 positively against the seat 22, regardless of any tendency of slurry particles to collect there.

Another feature of preference in the illustrated feeder is the contiguous arrangement of the reservoir 10 and the flushing chamber 20, allowing the slurry to flow, under suction and in measured quantity, directly through an essentially simple port 12 in the intervening wall, rather than through an elongated suction duct or the like.

It will now be seen that the present apparatus affords a particularly efficient and reliable arrangement for feeding a supplied liquid, especially a slurry, at a controlled or predetermined rate, and in an essentially continuous manner. The supply of slurry may be readily replenished without interruption, while an unusual advantage of the feeder is that it can handle very heavy slurries. Indeed present experience is that slurries containing as much as 25% to 60% or more of solids by weight, e. g. substances such as diatomaceous earth or powdered limestone, can be readily and appropriately fed from the reservoir 10, the upper limit of slurry concentration being apparently nothing less than a complete loss of fluidity. A corollary advantage of the handling of heavy slurries is that the apparatus may be relatively small and compact, requiring only a small reservoir or tank 10 to supply material, for the ultimate very dilute incorporation in the water or other liquid in pipe 35, as may be required over a considerable length of time.

It will be understood that the invention is not limited to the specific apparatus herein shown and described, but may be embodied in other forms without departure from its spirit.

I claim:

1. In a slurry feeder, in combination, a slurry reservoir, a receiving chamber having a common wall with the reservoir and having an opening through said wall into the reservoir, a valve member adapted to close against and open away from said opening, means including a diaphragm having a face in communication with the chamber, for varying the volume of the chamber to draw slurry from the reservoir through the passage, said chamber having inlet and outlet means for liquid to receive slurry, valve means controlling the flow through said inlet and outlet means and means for actuating said first-mentioned valve member, said second-mentioned valve means and said diaphragm positively and independently of the pressures acting thereon, said last-mentioned means including means timing said diaphragm relative to said valve member and valve means to withdraw slurry from the reservoir when said valve member is open and said valve means are closed, and means timing said valve member relative to said diaphragm and valve means to close against said opening when said diaphragm is at rest and said valve means are closed.

2. In feeding apparatus, in combination, a variable volume chamber, fluid supply means comprising passage means communicating with said chamber, means for cylically increasing and decreasing the volume of said chamber, to withdraw fluid from said passage means into the chamber during intervals of volume increase, valve means for the passage means, liquid supply and outlet means, supply valve means and outlet valve means respectively controlling the flow through said supply and outlet means and cooperating therewith for passing liquid into, through and out of said variable volume chamber, valve operating means for actuating the aforesaid passage, supply and outlet valve means positively and independently of the pressures acting thereon, and means connecting said valve operating means with said volume increasing and decreasing means for disposing said passage valve means in open position and said supply and outlet valve means in closed position in intervals of chamber volume increase, and for disposing the passage valve means in closed position and the supply and outlet valve means in open position during intervals intermediate said last-mentioned intervals.

3. Feeding apparatus as described in claim 2, wherein the liquid supply and outlet means comprises means delivering the liquid from the chamber into a body of liquid, and means for maintaining a higher pressure in the supply of liquid to the variable volume chamber than in the last-mentioned body of liquid.

4. In feeding apparatus, in combination, a variable volume chamber to be filled with a receiving liquid, fluid supply means comprising means providing a passage into said chamber, said chamber having periodic means for alternately increasing and decreasing the volume thereof, to withdraw fluid through the passage into the chamber during intervals of volume increase, valve means for the passage, liquid supply means and liquid outlet means for passing liquid into, through and out of said variable volume chamber, said supply and outlet means respectively having valve means therefor, valve operating means actuating said passage, supply and outlet valve means positively and independently of the pressures acting thereon, and means connecting said valve operating means with said periodic means for opening said passage valve means in intervals of chamber volume increase and for opening the supply and outlet valve means in intervals of chamber volume decrease, said valve operating means comprising means for maintaining the supply and outlet valve means closed when the passage valve means is open and for maintaining the passage valve means closed when the supply and outlet valve means are open.

5. Apparatus as described in claim 4, wherein the outlet means extends to a body of liquid into which liquid from the chamber is delivered, said liquid supply means, chamber and liquid outlet means constituting, when the supply and outlet valve means are open, a conduit for travel of liquid to said body, said apparatus including means for advancing liquid along said conduit, to traverse the chamber under pressure.

6. Apparatus as described in claim 4, which includes a main conduit carrying liquid under pressure into which said outlet means extends, said liquid supply means being connected to said conduit to draw liquid therefrom at a locality upstream of the connection of the outlet means, and said conduit having means providing a pressure drop between said supply and outlet means, to advance liquid through the variable volume chamber when the supply and outlet valve means are open.

7. Apparatus as described in claim 4, in which said fluid is a slurry, and comprising means including said liquid supply and outlet means and said supply and outlet valve means for conveying through said chamber during each opening of said supply and outlet valve means a volume of liquid equal to many times the displacement of said periodic means.

8. Apparatus as described in claim 4, in which said fluid is a slurry, and said variable volume chamber has a minimum volume at least several times the displacement of said periodic means.

9. In a liquid feeder, in combination, a liquid reservoir, a receiving chamber to be filled with carrier liquid and having a passage opening into the reservoir, said chamber having volume-varying means for alternately increasing and decreasing the volume of the chamber, to draw successive quantities of liquid from the reservoir through the passage during intervals when said volume is increasing, inlet means for the chamber, outlet means for the chamber, first, second and third valve means respectively controlling the flow through said passage, said inlet means and said outlet means, means for actuating each of said valves positively and independently of the pressures acting thereon, means connecting all said actuating means with said volume-varying means for operation in a mutually timed sequence, for alternately opening said second and third valve means to pass carrier liquid through said chamber via said inlet and outlet means while the first valve means is closed, and opening the first valve means to draw liquid from the reservoir into the liquid in the chamber when the chamber volume is increasing and the second and third valves are closed to interrupt the passage of carrier liquid through the chamber.

10. A liquid feeder as described in claim 9, wherein the first valve means for the passage comprises a valve seat around the passage and a valve member in the chamber movable against and away from said seat and wherein each of the second and third valve means for the inlet and outlet means comprises an apertured valve seat and a member movable against and away from such last-mentioned seat.

11. Apparatus as described in claim 9, in which the liquid being fed is a slurry, and the valve actuating means cooperates with the connecting means to close the passage valve means only at times when the valve means for the inlet and outlet means are both closed and the volume-varying means is at rest, so that no slurry is moving through the passage valve means when it is closing.

References Cited in the file of this patent

UNITED STATES PATENTS

| | | |
|---|---|---|
| 1,576,617 | Prince | Mar. 16, 1926 |
| 2,130,417 | Butzler | Sept. 20, 1938 |
| 2,216,921 | Marvel | Oct. 8, 1940 |
| 2,238,747 | Ornstein | Apr. 15, 1941 |
| 2,417,372 | Morris | Mar. 11, 1947 |
| 2,529,028 | Landon | Nov. 7, 1950 |